US012755467B2

(12) United States Patent
Yu et al.

(10) Patent No.: US 12,755,467 B2
(45) Date of Patent: Oct. 6, 2026

(54) SOUND EFFECT DISPLAY METHOD AND TERMINAL DEVICE

(71) Applicant: Beijing Zitiao Network Technology Co., Ltd., Beijing (CN)

(72) Inventors: Yan Yu, Beijing (CN); Zihao Chen, Los Angeles, CA (US); Chenyu Sun, Los Angeles, CA (US); Yipeng Huang, Beijing (CN); Chaopeng Liu, Beijing (CN); Siyuan Wan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 166 days.

(21) Appl. No.: 18/695,328

(22) PCT Filed: Sep. 16, 2022

(86) PCT No.: PCT/CN2022/119309
§ 371 (c)(1),
(2) Date: Mar. 25, 2024

(87) PCT Pub. No.: WO2023/071595
PCT Pub. Date: May 4, 2023

(65) Prior Publication Data

US 2025/0014252 A1 Jan. 9, 2025

(30) Foreign Application Priority Data

Oct. 25, 2021 (CN) ......................... 202111241087.8

(51) Int. Cl.
*G06T 13/20* (2011.01)
*G06F 3/16* (2006.01)
(Continued)

(52) U.S. Cl.
CPC ............ *G06T 13/205* (2013.01); *G06F 3/165* (2013.01); *G06T 5/70* (2024.01); *G06T 15/20* (2013.01);
(Continued)

(58) Field of Classification Search
CPC ......... G06T 13/205; G06T 5/70; G06T 15/20; G06T 19/20; G06T 2210/56;
(Continued)

(56) References Cited

U.S. PATENT DOCUMENTS

| | | | | |
|---|---|---|---|---|
| 10,319,116 | B1 * | 6/2019 | C | G09G 5/377 |
| 11,182,978 | B1 * | 11/2021 | Kurz | G06T 5/70 |

(Continued)

FOREIGN PATENT DOCUMENTS

| | | |
|---|---|---|
| CN | 1885976 A | 12/2006 |
| CN | 101320480 A | 12/2008 |

(Continued)

OTHER PUBLICATIONS

Grapher, Motion. Album Cover Animation After Effects. YouTube, YouTube, Aug. 16, 2020, www.youtube.com/watch?v=O8yC0_5xRzk. (Year: 2020).*

(Continued)

*Primary Examiner* — Kee M Tung
*Assistant Examiner* — Nauman U Ahmad
(74) *Attorney, Agent, or Firm* — Astute IP Law Group

(57) ABSTRACT

Provided are a sound effect display method and a terminal device. The method includes receiving a first operation input for a target audio file; and in response to the first operation, displaying a sound effect display interface corresponding to the target audio file, the sound effect display interface includes a foreground image and a background image, the foreground image includes a cover image corresponding to the target audio file, the background image is an image (Continued)

obtained by photographing a particle dot matrix at a preset photographic angle, the particle dot matrix includes a plurality of particle dots, initial positions of which are located on a first plane, and each particle dot of the particle dot matrix moves, according to a preset sound attribute of the target audio file, in the direction perpendicular to the first plane.

20 Claims, 3 Drawing Sheets

(51) Int. Cl.
*G06T 5/70* (2024.01)
*G06T 15/20* (2011.01)
*G06T 19/20* (2011.01)

(52) U.S. Cl.
CPC .......... *G06T 19/20* (2013.01); *G06T 2210/56* (2013.01); *G06T 2219/2012* (2013.01)

(58) Field of Classification Search
CPC . G06T 2219/2012; G06T 11/00; G06F 3/165; G06F 3/048; G06F 3/167
See application file for complete search history.

(56) References Cited

U.S. PATENT DOCUMENTS

| | | | |
|---|---|---|---|
| 2011/0214554 A1 | 9/2011 | Nakadai et al. | |
| 2015/0205570 A1* | 7/2015 | Johnston | G06F 3/04842 715/727 |
| 2017/0212876 A1* | 7/2017 | Gou | G06F 40/166 |
| 2018/0115700 A1* | 4/2018 | Ryan | G06T 3/18 |

FOREIGN PATENT DOCUMENTS

| | | | | |
|---|---|---|---|---|
| CN | 105512272 | A | | 4/2016 |
| CN | 106575424 | A | | 4/2017 |
| CN | 108566483 | A | | 9/2018 |
| CN | 108986588 | A | | 12/2018 |
| CN | 109003321 | A | | 12/2018 |
| CN | 109003322 | A | | 12/2018 |
| CN | 109814956 | A | * | 5/2019 |
| CN | 111249727 | A | | 6/2020 |
| CN | 112529997 | A | | 3/2021 |
| CN | 113190156 | A | | 7/2021 |
| CN | 113885828 | A | | 1/2022 |

OTHER PUBLICATIONS

Kreative, Noble. 3D Abstract Particles Audio Visualizer in AE | Noplugins. YouTube, YouTube, Jul. 5, 2020, www.youtube.com/watch?v=vC6GndwmP-Q. (Year: 2020).*

International Search Report received for PCT/CN2022/119309, mailed Dec. 7, 2022, 6 pages.

Office Action received for Chinese Patent Application No. 202111241087.8, mailed Apr. 12, 2023, 15 pages.

* cited by examiner

SOUND EFFECT DISPLAY METHOD AND TERMINAL DEVICE

This is a national stage application based on International Patent Application No. PCT/CN2022/119309, filed Sep. 16, 2022, which claims priority to Chinese Patent Application No. 202111241087.8, entitled "A Method of Displaying Sound Effect and Terminal Device" submitted on Oct. 25, 2021, the disclosures of which are incorporated herein by reference in their entireties.

TECHNICAL FIELD

The present invention relates to the field of terminal technology, especially to a method of displaying a sound effect and a terminal device.

BACKGROUND

With the continuous development of the multimedia technology, users are no longer satisfied only with the status that a playing device can provide an audio or video files restored at high-precision, but put forward a new requirement for the overall feeling on the playing content.

At present, most of audio playing applications (Applications) have focused on the users' listening experience when an audio is played, but overlook the effect of the visual experience of the sound effect display interface on the overall feeling of the audio playing. Because the effect of the visual experience of the sound effect display interface on the overall feeling of the audio playing is not considered, many audio playing applications display a very monotonous image in the display screen of a terminal device in scenes, such as playing audio files. For example, some music playing applications always display a static picture associated with the played music on the music player interface when playing songs. However, the visual experience of the sound effect display interface has a very important influence on the overall experience of the audio playing, and thus how to improve the visual experience of the sound effect display interface is also a very important research topic.

SUMMARY OF THE INVENTION

In light of this, the embodiments of the present application provide a method of displaying a sound effect and a terminal device to improve the visual experience of the sound effect display interface.

To achieve the above object, the embodiments of the present application provide the following technical solutions:

In a first aspect, an embodiment of the present application provides a method of displaying a sound effect comprising: receiving a first operation that is input to a target audio file; and displaying a sound effect display interface corresponding to the target audio file in response to the first operation; the sound effect display interface comprises: a foreground image comprising a cover image corresponding to the target audio file, and a background image which is an image obtained by shooting a particle dot matrix at a preset shooting angle, the particle dot matrix comprises a plurality of particle dots with initial positions on a first plane, and each particle dot in the particle dot matrix moves in a direction perpendicular to the first plane according to a preset sound attribute of the target audio file so that the particle dot matrix fluctuates according to the preset sound attribute of the target audio file.

In a second aspect, an embodiment of the present application provides a terminal device, comprising: a receiving unit configured to receive a first operation that is input to a target audio file; and a displaying unit configured to display a sound effect display interface corresponding to the target audio file in response to the first operation; the sound effect display interface comprises: a foreground image comprising a cover image corresponding to the target audio file, and a background image which is an image obtained by shooting a particle dot matrix at a preset shooting angle, the particle dot matrix comprises a plurality of dots with initial positions on a first plane, and each particle dot in the particle dot matrix moves in a direction perpendicular to the first plane according to a preset sound attribute of the target audio file so that the particle dot matrix fluctuates according to the preset sound attribute of the target audio file.

In a third aspect, an embodiment of the present application provides an electronic device comprising: a memory configured to store a computer program and a processor configured to enable the electronic device to implement the method of displaying a sound effect according to any one of the above embodiments upon calling the computer program.

In a fourth aspect, an embodiment of the present application provides a computer-readable storage medium having a computer program stored thereon, the computer program enables a computing device to implement the method of displaying a sound effect according to any one of the above embodiments upon the computer program being executed by the computing device.

In a fifth aspect, an embodiment of the present application provides a computer program product, which enables the computer to implement the method of displaying a sound effect according to any one of the above embodiments upon being executed on the computer.

The method of displaying a sound effect provided in the embodiments of the present application displays a sound effect display interface corresponding to the target audio file in response to a first operation upon receipt of the first operation that is input to the target audio file. The sound effect display interface comprises: a foreground image comprising a cover image corresponding to the target audio file, and a background image which is an image obtained by shooting a particle dot matrix at a preset shooting angle, the particle dot matrix comprises a plurality of dots with initial positions on a first plane, and each particle dot in the particle dot matrix can move in a direction perpendicular to the first plane according to a preset sound attribute of the target audio file so that the particle dot matrix fluctuates according to the preset sound attribute of the target audio file, and thus, the particle dot matrix on the sound effect display interface can move with rhythm following the preset sound attribute of the target audio file, thereby creating a sound effect display effect of the particle dot matrix moving with rhythm in a three-dimensional space. In this way, the embodiments of the present application can improve a visual experience of the sound effect interface.

BRIEF DESCRIPTION OF THE DRAWINGS

The accompanying drawings herein are incorporated into and constitute a part of this specification, which illustrate the embodiments in conformity with the present application and serve to explain the principles of the present application together with the description.

To illustrate the technical solutions in embodiments of the present application or the related art more clearly, the accompanying drawings which are required to describe the embodiments or the related art will be briefly described below. Apparently, for one of ordinary skill in the art, other drawings can be obtained on the basis of these drawings without any creative work.

DETAILED DESCRIPTION

To understand the above objects, features, and advantages more clearly, the solutions of the present application will be further described below. It is to be noted that, without conflicting with each other, the embodiments and features in embodiments of the present application can be combined with each other.

Many particular details are set forth in the following description to sufficiently understand the present application, but the present application can be implemented by other ways than those described herein. Apparently, the embodiments in the description are merely some, not all embodiments of the present application.

In the embodiments of the present application, the terms like "exemplary" or "for example/such as", etc. are used to represent an example, exemplary illustration, or explanation. Any embodiment or design described as being "exemplary" or "for example/such as" should not be construed to be more preferable or advantageous over other embodiments or designs. Specifically, the use of the terms "exemplary" or "for example/such as" is intended to present an associated concept in a specific manner. In addition, in the description of the embodiments of the present application, "a plurality of/multiple" refers to two or more, unless otherwise specified.

Figure 1:
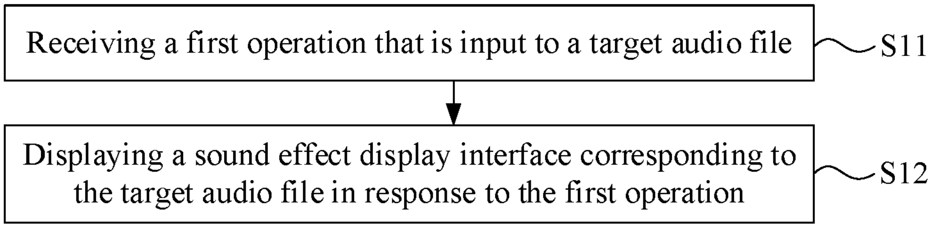
FIG. 1 is a flowchart of a method of displaying a sound effect provided in an embodiment of the present application.

Based on the above contents, the embodiments of the present application provide a method of displaying a sound effect. Referring to FIG. 1, the method of displaying a sound effect comprises the following steps.

S11. Receiving a first operation that is input to a target audio file.

The first operation in the embodiments of the present application can be either an operation configured to trigger the playing of the target audio file, or an operation configured to share the target audio file, or an operation configured to generate and pre-view a sound effect display interface of the target audio file. The first operation can specifically be a click operation to target audio file, or a voice command, or a specific gesture. In some embodiments of the present application, the specific gesture can be any one of a click gesture, swiping gesture, a pressure identification gesture, a long-press gesture, an area-changing gesture, a double-press gesture, and a double-click gesture.

The target audio file in the embodiments of the present application can be any type of audio files. For example, songs, audiobooks, accompaniment music, or the like.

S12. Displaying the sound effect display interface corresponding to the target audio file in response to the first operation.

The sound effect display interface comprises: a foreground image comprising a cover image corresponding to the target audio file, and a background image which is an image obtained by shooting a particle dot matrix at a preset shooting angle. The particle dot matrix comprises a plurality of dots with initial positions on a first plane, and each particle dot in the particle dot matrix moves in a direction perpendicular to the first plane according to a preset sound attribute of the target audio file so that the particle dot matrix fluctuates according to the preset sound attribute of the target audio file.

In some implementations, the preset sound attribute of the target audio file in the embodiment of the present application can be a loudness, a tone corresponding to the target audio file or the like, which is not limited in the embodiment of the present application.

In some implementations, the first plane of the embodiment of the present application can be any plane which is not parallel to a plane where the cover image is located.

It is to be noted that the attributes, such as shape, size, distance, arrangement way, and glowing effect of the particle dots constituting the particle dot matrix in the embodiment of the present application; the shape, the size, the distance, the arrangement way, and the glowing effect of the particle dots can be set as any values according to the requirements in the practical design. As an example, the shape of the particle dot can be set to be circular; and as another example, the shape of the particle dot can be set to rectangular.

It is also to be noted that the sound effect display interfaces are different display interfaces of the target audio file when the first operations are different operations to the target audio file. For example, the sound effect display interface can be a player interface of the target audio file when the first operation is a play operation that is input to the target audio file. As another example, the sound effect display interface can be a shared pre-view interface of the target audio file when the first operation is a sharing operation that is input to the target audio file.

Figure 2:
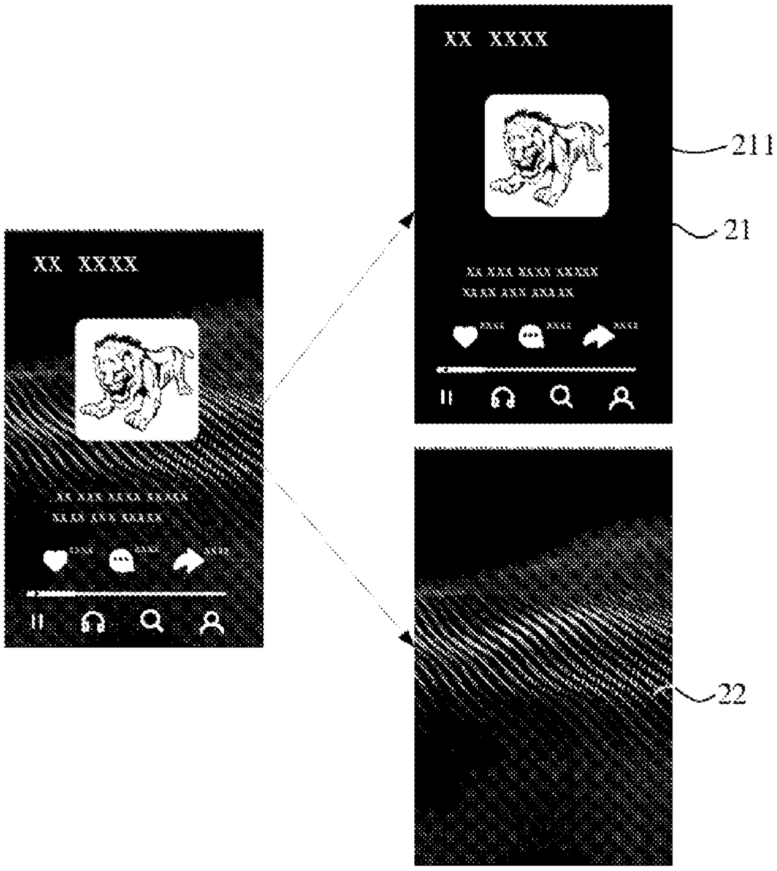
FIG. 2 is a schematic diagram of a sound effect interface provided in the embodiment of the present application.
Figure 3:
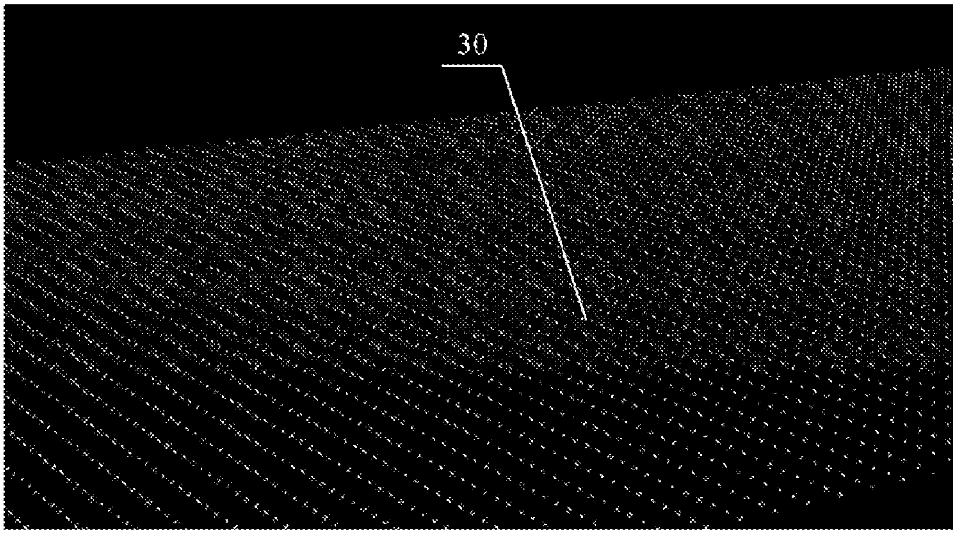
FIG. 3 is a first schematic diagram of the dot matrix array provided in an embodiment of the present application.

For example, referring to FIG. 2, the sound effect display interface comprises: a foreground image 21 and a background image 22. The foreground image 21 comprises a cover image 211 corresponding to the target audio file, and the background image 22 is an image obtained by shooting the particle dot matrix 30 shown in FIG. 3 at a preset shooting angle, the particle dot matrix 30 comprises a plurality of dots with initial positions on a first plane. Each particle dot in the particle dot matrix 30 moves in a direction perpendicular to the first plane according to the preset sound attribute of the target audio file so that the particle dot matrix 30 fluctuates according to the preset sound attribute of the target audio file.

The method of displaying a sound effect provided in the embodiments of the present application displays a sound effect display interface corresponding to the target audio file in response to a first operation upon receipt of the first operation that is input to the target audio file. The sound effect display interface comprises: a foreground image comprising a cover image corresponding to the target audio file, and a background image which is an image obtained by shooting a particle dot matrix at a preset shooting angle, the particle dot matrix comprises a plurality of dots with initial positions on a first plane, and each particle dot in the particle dot matrix can move in a direction perpendicular to the first plane according to a preset sound attribute of the target audio file so that the particle dot matrix fluctuates according to the preset sound attribute of the target audio file, and thus the particle dot matrix on the sound effect display interface can move with rhythm following the preset sound attribute of the target audio file, thereby creating a sound effect display effect of the particle dot matrix moving with rhythm in a three-dimensional space. In this way, the embodiments of the present application can improve a visual experience of the sound effect interface.

In some implementations, the method of displaying a sound effect provided in the embodiments of the present application further comprises the following step a and step b.

Step a: Acquiring a blur parameter of each particle dot in the particle dot matrix.

The blur parameter of the particle dot is an absolute difference between a distance from the particle dot to a virtual camera and a focal length of the virtual camera.

Specifically, the virtual camera in the embodiment of the present application refers to a virtual camera which can shoot a dot model including the particle dot matrix and creates the background image of the embodiment of the present application.

Given: the $i^{th}$ dot in the particle dot matrix has a blur parameter of $X_i$, the distance from the $i^{th}$ dot to the virtual camera is $H_1$, and the focal length of the virtual camera is f, then:

$$X_i = |H_i - f|$$

Step b: Blurring each particle dot according to the blur parameter of each particle dot.

The blur degree of the particle dot is positively related to the blur parameter of the particle dot.

That is, for the particle dot in the particle dot matrix, the greater the blur parameter of the particle dot (the absolute difference between the distance from the particle dot to the virtual camera and the focal length of the virtual camera) is, the higher the blur degree is; and the less the blur parameter is, the lower the blur degree is.

Further, when the background image is generated by rendering with the particle dot model including the particle dot matrix and the virtual camera, the aperture parameter of the virtual camera can be adjusted to a relatively large value so that the particle dot in the particle dot matrix can be blurred according to the absolute difference between the distance from the particle dot in the particle dot matrix to the virtual camera and the focal length of the virtual camera.

Because the above embodiment will further acquire the blur parameter of each particle dot in the particle dot matrix and blur each particle dot according to the blur parameter of each particle dot, the above embodiment can make a particle dot with smaller blur parameter clearer, a particle dot with larger blur parameter more vague, thereby improve a spatial sense of the particle dot matrix.

Further, the focus of the virtual camera is located at a target position on the first plane, which is a position corresponding to a geometric center of the cover image on the first plane; and the focal length of the virtual camera is a distance from the target position to the virtual camera.

The focus of the virtual camera is located at a position (the target position) corresponding to the geometric center of the cover image on the first plane, and the focal length of the virtual camera is a distance from the target position to the virtual camera. Thus, the particle dots located near the cover image have smaller blur parameters, while the particle dots away from the cover image have larger blur parameters so that the above embodiments can make the particle dots near the cover image clearer and the particle dots away from the cover image more vague, and then an area of interest in the sound effect display interface is set in the area where the cover image is located.

In some implementations, the method of displaying a sound effect provided in the embodiment of the present application further comprises the following step I and step II:

Step I: Acquiring a depth value of each particle dot in the particle dot matrix.

The depth value of the particle dot is a distance from the particle dot to the virtual camera.

Step II: Setting a size of each particle dot according to the depth value of each particle dot.

The size of the particle dot is negatively related to the depth value of the particle dot.

That is, the larger the distance from the particle dot in the particle dot matrix to the virtual camera is, the smaller the size of the particle dot is; while the smaller the distance from the particle dot in the particle dot matrix to the virtual camera is, the larger the size of the particle dot is.

The above embodiments have acquired the depth value of each particle dot in the particle dot matrix, and set the size of each particle dot in accordance with the depth value of the each particle dot, and the size of the particle dot is negatively related to the depth value of the particle dot, thus, the above embodiments can allow the particle dots in the particle dot matrix to be larger on a far side and smaller on a near side so that they more conform to the human visual principles, which improves the reality sense of the sound effect display interface.

In some implementations, an implementation of displaying a sound effect display interface corresponding to the target audio file comprises the following steps.

Step 1: Determining a movement distance of each particle dot in the particle dot matrix according to a preset sound attribute of the target audio file and a preset noise.

The movement distance of each particle dot in the particle dot matrix is determined according to the preset sound attribute of the target audio file and the preset noise, thus, the above embodiments can allow the particle dot matrix to fluctuate under the control of the preset noise when the target audio file has no sound output, thereby improving the display effect of the sound effect display interface.

In some implementations, an implementation of determining the movement distance of each particle dot in the particle dot matrix according to the preset sound attribute of the target audio file and the preset noise can comprise the following Step 11 to Step 13.

Step 11: Acquiring an amplitude corresponding to a current period according to an attribute value of the preset sound attribute corresponding to the current period.

Specially, it is possible to take a preset time length as period, periodically sample the audio frames of the audio file to acquire a key audio frame corresponding to each period, and take the attribute value of the preset sound attribute of the key audio frame corresponding to each period as the attribute value of the preset sound attribute corresponding to each period.

In some implementations, an implementation of acquiring the amplitude corresponding to the current period according to the attribute value of the preset sound attribute corresponding to the current period comprises: acquiring a first calculated value according to an amplitude corresponding to the last period and a preset attenuation coefficient; and acquiring an amplitude corresponding to the current period according to the first calculated value and the attribute value of the preset sound attribute corresponding to the current period.

For example, the preset attenuation coefficient can be 0.5.

The embodiment of the present application acquires the first calculated value according to the amplitude according to the last period and the preset attenuation coefficient and acquires the amplitude corresponding to the current period according to the first calculated value and the attribute value of the preset sound attribute corresponding to the current period, thus, the embodiment of the present application can allow a smooth transition of the amplitude between various periods, thereby improving the visual effect of the sound effect display interface.

Further, the amplitude corresponding to the current period is a sum of the first calculated value and the attribute value of the preset sound attribute corresponding to the current period.

Given: the amplitude corresponding to the current period is $A_n$, the amplitude corresponding to the last period is $A_{n-1}$, and the attribute value of the preset sound attribute corresponding to the current period is $Q_n$, and the preset attenuation coefficient is a, then, $$A_n = A_{n-1} * a + Q_n$$

Step 12: Determining a first distance from each particle dot in the particle dot matrix corresponding to the current period to the first plane according to the initial position of each particle dot in the particle dot matrix and the preset noise.

Given: the first distance of the $n^{th}$ particle dot in the particle dot matrix to the first plane is $h_n$, then, $$h_n = f(x_n^0, z_n^0, T)$$

where f( . . . ) is a function corresponding to the preset noise, $$x_n^0 \text{ and } z_n^0$$

are coordinates of the $n^{th}$ particle dot of the particle dot matrix in the first plane, and T is the time.

Step 13: Determining a movement distance of each particle dot in the particle dot matrix corresponding to the current period according to the amplitude corresponding to the current period and the first distance from each particle dot in the particle dot matrix corresponding to the current period to the first plane.

In some implementations, the movement distance of each particle dot in the particle dot matrix corresponding to the current period is a product of the first distance from each particle dot in the particle dot matrix corresponding to the current period to the first plane and the amplitude corresponding to the current period.

Given: the movement distance of the $n^{th}$ particle dot in the particle dot matrix corresponding to the current period is $H_n$, the first distance from the $n^{th}$ particle dot in the particle dot matrix corresponding to the current period to the first plane is $h_n$, and the amplitude corresponding to the current period is $A_n$, then, $$H_n = h_n * A_n$$

Step 2: Rendering the particle dot matrix according to the movement distance of each particle dot in the particle dot matrix to generate the background image.

Exemplarily, it is possible to input the movement distances of various particle dots in the particle dot matrixes corresponding to various periods as parameter into a GPU particle rendering system, and rendering a particle model comprising the particle matrix by the GPU particle rendering system to give the background image.

Step 3: Displaying the background image and superposing and displaying the foreground image onto the background image.

In some implementations, it is possible to generate two respective layers which are superposed and displayed, and display the background image on the lower layer and the foreground image on the upper layer.

In some implementations, the foreground image has a light transmission of 0%, a background image has a light transmission of 30%, and the sound effect display interface can further comprise a layer for displaying the background color of the sound effect display interface located below the background image and a bottom layer located at the lowermost layer.

Figure 4:
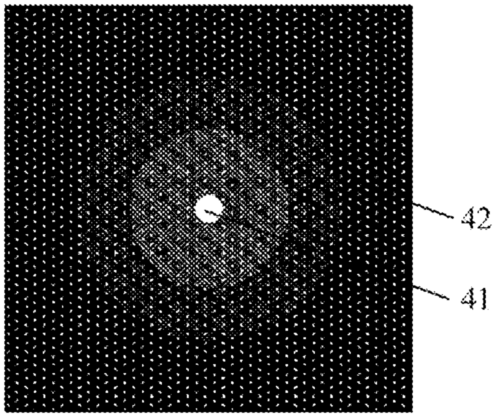
FIG. 4 is a second schematic diagram of the dot matrix array provided in an embodiment of the present application.

In some implementations, referring to FIG. 4, from the center 41 of the particle dot matrix along various directions to the edges 42 of the particle dot matrix, the colors of the particle dots in the particle dot matrix gradually change from a first color to a second color (in FIG. 4, it is shown by taking the first color as white color and the second color as black color as an example).

In some implementations, before the above Step S12 (showing the sound effect display interface corresponding the target audio file), the sound effect display method provided in the embodiment of the present application further comprises: determining the first color, the second color, and the background color of the sound effect display interface.

In some implementations, an implementation of determining the first color, the second color and the sound effect display interface according to the color of the cover image can comprise the following Step to Step III.

Step i: Acquiring an average color value of various pixels of the cover image.

That is, acquiring color values of various pixels in the cover image, and dividing the sum of the color values of the various pixels by the number of the pixels in the cover image to obtain the average color value of the various pixels in the cover image.

Step ii: Converting the average color value into a color in an HSV color space to obtain a basic color.

Specifically, the HSV color space is a color space representing colors by hue (Hue), saturation (Saturation) and brightness (Value), any color in the HSV color space comprises a parameter H configured to represent the hue, a parameter S configured to represent the saturation, and a parameter V configured to represent the value.

Colors in different color spaces have specific conversion formula, and thus it is possible to determine the conversion formula according to the color space to which the cover image belongs, and then converting the average color value in accordance with the determined conversion formula to obtain a basic color. For example, if the cover image belong to the RGB color space, the average color value will be converted according to the conversion formula between the RGB color space and the HSV color space to obtain a basic color.

Step iii: Determining the first color, the second color, and a background color of the sound effect display interface according to the basic color.

In some implementations, the determining the first color according to the basic color comprises: determining that a hue of the first color is the same as a hue of the basic color; determining that a saturation of the first color is the same as a saturation of the basic color if the saturation of the basic color is greater than or equal to a threshold saturation; and determining that the saturation of the first color is a sum of a saturation of the basic color and a preset saturation if the saturation of the basic color is less than the threshold saturation; and determining a value of the first color as a maximum value.

Given: the hue, the saturation, the value of the basic color are $H_0$, $S_0$, and $V_0$, respectively, and the hue, the saturation, and the value of the first color are $H_1$, $S_1$, and $V_1$, respectively, the threshold saturation is $S_{threshold}$, the preset saturation is a, then, $$H_1 = H_0$$

$$S_2 = \begin{cases} S_0 & S_0 \geq S_{threshold} \\ S_0 + a & S_0 < S_{threshold} \end{cases}$$

$$V_1 = 100.$$

In some implementations, the determining the second color according to the basic color comprises: determining that a hue of the second color is a sum of a hue of the basic color and a preset hue; determining that a saturation of the second color is the same as a saturation of the basic color if the saturation of the basic color is greater than or equal to a threshold saturation; and determining that the saturation of the second color is a sum of a saturation of the basic color and a preset saturation if the saturation of the basic color is less than the threshold saturation; and determining a value of the second color as a maximum value.

Given: the hue, the saturation, the value of the basic color are $H_0$, $S_0$, and $V_0$, respectively, and the hue, the saturation, and the value of the second color are $H_2$, $S_2$, and $V_2$, respectively, the threshold saturation is $S_{threshold}$, the preset saturation is a, the preset hue is b, then, $$H_2 = H_0 + b$$

$$S_2 = \begin{cases} S_0 & S_0 \geq S_{threshold} \\ S_0 + a & S_0 < S_{threshold} \end{cases}$$

$$V_2 = 100.$$

In some implementations, the determining the background color according to the basic color comprises: determining that a hue of the background color is the same as a hue of the basic color; determining that a saturation of the background color is the same as a saturation of the basic color if the saturation of the basic color is greater than or equal to a threshold saturation; and determining that the saturation of the background color is a sum of the saturation of the basic color and a preset saturation if the saturation of the basic color is less than the threshold saturation; and determining a value of the background color is a difference between a value of the basic color and a target value, the target value is a value corresponding to a value range to which the value of the basic color belongs, and the value corresponding to the value range is positively correlated with the central value of the value range.

Exemplarily, the correspondence relationship between the value range and value can be as shown in Table 1 below.

TABLE 1

| Value Range | Corresponding Value |
|---|---|
| [100, 90] | 55 |
| [90, 80] | 50 |
| [80, 70] | 45 |
| [70, 60] | 40 |
| [60, 50] | 35 |
| [50, 40] | 30 |
| [40, 30] | 25 |
| [30, 25] | 20 |
| [25, 20] | 15 |
| [20, 15] | 10 |
| [15, 10] | 7 |
| [10, 5] | 3 |
| [5, 0] | 2 |

Given: the hue, the saturation, the value of the basic color are $H_0$, $S_0$, and $V_0$, respectively, and the hue, the saturation, and the value of the background color are $H_3$, $S_3$, and $V_3$, respectively, the threshold saturation is $S_{threshold}$, the preset saturation is a, the correspondence relationship between the value range and the value is as shown in Table 1 above, then, $$H_3 = H_0$$

$$S_3 = \begin{cases} S_0 & S_0 \geq S_{threshold} \\ S_0 + a & S_0 < S_{threshold} \end{cases}$$

$$V_3 = V_0 - c$$

where, when $100 \geq V_0 \geq 90$, c=55; when $90 > V_0 \geq 80$, c=50; when $80 > V_0 \geq 70$, c=45; when $70 > V_0 \geq 60$, c=40; when $60 > V_0 \geq 50$, c=35; when 50>V, ≥40, c=30; when $40 > V_0 \geq 30$, c=25; when $30 > V_0 \geq 25$, c=20; when $25 > V_0 \geq 20$, c=15; when 20>V, ≥15, c=10; when $15 > V_0 \geq 10$, c=7; when $10 > V_0 \geq 5$, c=3; and when $5 > V_0 \geq 0$, c=2.

The above embodiment can determine the first color, the second color, and the background color in the sound effect display interface according to the cover image of the audio file, thus, the embodiments of the present application can make the color of the sound effect display interface more correlatively matching the cover image, thereby improving the user's visual experience.

Based on the same invention concept, as an implementation of the above method, the embodiments of the present application also provide a terminal device, and the device embodiment corresponds to the above method embodiment. For convenience of reading, this device embodiment will not reiterate the details of the above method embodiment one by one, but it should be clear that the terminal device in the embodiment can correspond to the entire content of the above method embodiment.

Figure 5:
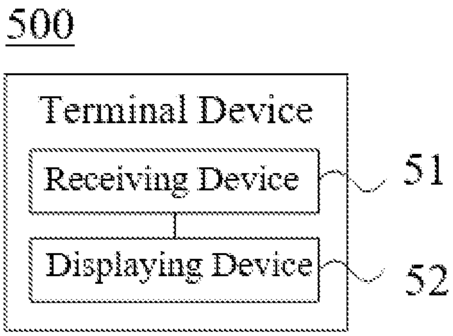
FIG. 5 is a structural schematic diagram of a terminal device provided in an embodiment of the present application.

The embodiments of the present application provide a terminal device. FIG. 5 is a structural schematic diagram. As shown in FIG. 5, the terminal device 500 comprises: a receiving unit 51 configured to receive a first operation that is input to a target audio file; and a displaying unit 52 configured to display a sound effect display interface corresponding to the target audio file in response to the first operation; the sound effect display interface comprises: a foreground image comprising a cover image corresponding to the target audio file, and a background image which is an image obtained by shooting a particle dot matrix at a preset shooting angle, the particle dot matrix comprises a plurality of dots with initial positions on a first plane, and each particle dot in the particle dot matrix moves in a direction perpendicular to the first plane according to a preset sound attribute of the target audio file so that the particle dot matrix fluctuates according to the preset sound attribute of the target audio file.

In some implementations, the displaying unit 52 is further configured to acquire a blur parameter of each particle dot in the particle dot matrix, the blur parameter of the particle dot is an absolute difference between a distance from the particle dot to a virtual camera and a focal length of the virtual camera; and blur each particle dot according to the blur parameter of each particle dot; the blur degree of the particle dot is positively related to the blur parameter of the particle dot.

In some implementations, the focus of the virtual camera is located at a target position on the first plane, which is a position corresponding to a geometric center of the cover image on the first plane; and the focal length is a distance from the target position to the virtual camera.

In some implementations, the displaying unit 52 is further configured to acquire a depth value of each particle dot in the particle dot matrix, the depth value of the particle dot is an distance from the particle dot to a virtual camera; and set a size of each particle dot according to the depth value of each particle dot; the size of the particle dot is negatively related to the depth value of the particle dot.

In some implementations, the displaying unit 52 is specially configured to determine the movement distance of each particle dot in the particle dot matrix according to a preset sound attribute of the target audio file and the preset noise; render the particle dot matrix according to the movement distance of each particle dot in the particle dot matrix to generate the background image; display the background image and superpose and display the foreground image on the background image.

In some implementations, the displaying unit 52 is specially configured to acquire the amplitude corresponding to the current period according to the attribute value of the preset sound attribute corresponding to the current period; determine the first distance from each particle dot in the particle dot matrix corresponding to the current period to the first plane according to the initial position of each particle dot in the particle dot matrix and the preset noise; and determine the movement distance of each particle dot in the particle dot matrix corresponding to the current period according to the amplitude corresponding to the current period and the first distance from each particle dot in the particle dot matrix corresponding to the current period to the first plane.

In some implementations, the displaying unit 52 is specially configured to acquire the first calculated value according to the amplitude according to the last period and the preset attenuation coefficient; and acquire the amplitude corresponding to the current period according to the first calculated value and the attribute value of the preset sound attribute corresponding to the current period.

In some implementations, the first calculated value is a product of the amplitude corresponding to the last period and the preset attenuation coefficient; the amplitude corresponding to the current period is a sum of the first calculated value and the attribute value of the preset sound attribute corresponding to the current period.

In some implementations, the movement distance of each particle dot in the particle dot matrix corresponding to the current period is a product of the first distance from each particle dot in the particle dot matrix corresponding to the current period to the first plane and the amplitude corresponding to the current period.

In some implementations, from the center of the particle dot matrix along various directions to the edges of the particle dot matrix, the colors of the particle dots in the particle matrix gradually change from the first color to the second color.

In some implementations, the displaying unit 52 is further configured to acquire an average color value of various pixels of the cover image before displaying the sound effect display interface corresponding to the target audio file; converting the average color value to a color in the HSV color space to obtain a basic color; and determining the first color, the second color, and the background color of the sound effect display interface according to the basic color.

In some implementations, the displaying unit 52 is specifically configured to determine that the hue of the first color is the same as a hue of the basic color; determine that a saturation of the first color is the same as a saturation of the basic color if the saturation of the basic color is greater than or equal to a threshold saturation; and determine that the saturation of the first color is a sum of a saturation of the basic color and a preset saturation if the saturation of the basic color is less than the threshold saturation; and determine a value of the first color as a maximum value.

In some implementations, the displaying unit 52 is specifically configured to determine that the hue of the second color is a sum of the hue of the basic color and a preset hue; determine that a saturation of the second color is the same as a saturation of the basic color if the saturation of the basic color is greater than or equal to a threshold saturation; and determine that the saturation of the second color is a sum of the saturation of the basic color and a preset saturation if the saturation of the basic color is less than the threshold saturation; and determine the value of the second color as the maximum value.

In some implementations, the displaying unit 52 is specifically configured to determine that the hue of the background color is the same as a hue of the basic color; determine that a saturation of the background color is the same as a saturation of the basic color if the saturation of the basic color is greater than or equal to a threshold saturation; and determine that the saturation of the background color is a sum of the saturation of the basic color and a preset saturation if the saturation of the basic color is less than the threshold saturation; and determine that the value of the background color is a difference between a value of the basic color and a target value, the target value is a value corresponding to the value range to which the value of the basic color belongs, and the value corresponding to the value range is positively correlated with the central value of the value range.

The terminal device provided in this embodiment can perform the method of displaying a sound effect provided in the above embodiments. Their implementation principles and technical effects are similar and thus not repeated herein.

Figure 6:
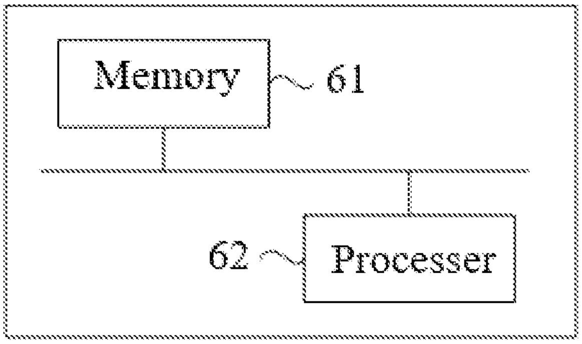
FIG. 6 is a schematic diagram of hardware structure of an electronic device provided in an embodiment of the present application.

Based on the same invention concept, the embodiments the present application also provide a computer device. FIG. 6 is a structural schematic diagram of an electronic device provided in the embodiments of the present application. As shown in FIG. 6, the electronic device provided in the embodiment comprises: a memory 61 configured to store a computer program and a processor 62 configured to enable the electronic device to perform the method of displaying a sound effect described in any one of provided embodiments upon calling the computer program.

The embodiments of the present application also provide a computer-readable storage medium having a computer program stored thereon, and the computer program enables a computing device to perform the method of displaying a sound effect described in the above embodiments upon the computer program being executed by the computing device.

The embodiments of the present application also provide a computer program product, which enables the computer to perform the method of displaying a sound effect described in the above embodiments upon being executed on the computer.

It is to be understood by those skilled in the art that embodiments of the present application may be provided as a method, a system, or a computer program product. Therefore, the present application may be in a form of an entirely hardware embodiment, an entirely software embodiment, or an embodiment combining software aspect and hardware aspect. Furthermore, the present application may be in a form of a computer program product embodied on one or more computer usable storage mediums having computer usable program codes included therein.

The processor can be a central processing unit (CPU), and can also be other general processors, a digital signal processor (DSP), an application specific integrated circuit (ASIC), a field-programmable gate array (FPGA) or other programmable logic devices, a discrete gate or a transistor logic device, a discrete hardware component or the like. The general processor can be a microprocessor, or the processor can also be any conventional processor or the like.

The memory may include the form of a non-permanent memory, a random-access memory (RAM) and/or a non-volatile memory in a computer-readable medium, such as a read-only memory (ROM) or a flash memory (flash RAM). The memory is an example of the computer-readable medium.

The computer-readable medium includes a permanent or non-permanent, removable or non-removable storage medium. The storage medium can store information by any method or technology, and the information can be computer-readable instructions, data structures, program modules or other data. Examples of the storage medium for computers include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic cassette, magnetic disk storage or other magnetic storage devices or any other non-transmission medium, which can be used for storing information accessible by a computing apparatus. According to the definition in the present application, the computer-readable medium does not include temporary storage of computer readable media (transitory media), such as modulated data signals and carrier waves.

Finally, it is to be noted that the above embodiments are only used to illustrate, not restrict the technical solutions of the present application. Although the present application is described in detail with reference to the above embodiments, it is to be understood for one of ordinary skill in the art that it is still possible to make modification to the technical solutions recorded in the above embodiments, or make equivalent substitution to some or all of the technical features therein, and such modifications or substitutions will not make the nature of the corresponding technical solutions depart from the scope of the technical solutions of the embodiments of the present application.

What is claimed is:

1. A method of displaying a sound effect, comprising:

receiving a first operation that is input to an audio file; and displaying a sound effect display interface corresponding to the audio file in response to the first operation;

wherein the sound effect display interface comprises: a foreground image comprising a cover image corresponding to the audio file, and a background image which is an image obtained by shooting a particle dot matrix at a shooting angle, wherein the particle dot matrix comprises a plurality of dots with initial positions on a first plane, and each particle dot in the particle dot matrix moves in a direction perpendicular to the first plane according to a sound attribute of the audio file so that the particle dot matrix fluctuates according to the sound attribute of the audio file; and wherein displaying the sound effect display interface corresponding to the audio file comprises:

acquiring a first calculated value according to an amplitude corresponding to a last period and an attenuation coefficient;

acquiring an amplitude corresponding to a current period according to the first calculated value and an attribute value of a sound attribute corresponding to the current period;

determining a first distance from each particle dot in a particle dot matrix corresponding to the current period to a first plane according to an initial position of each particle dot in the particle dot matrix and a noise;

determining a movement distance of each particle dot in the particle dot matrix corresponding to the current period according to the amplitude corresponding to the current period and the first distance from each particle dot in the particle dot matrix corresponding to the current period to the first plane;

rendering the particle dot matrix according to the movement distance of each particle dot in the particle dot matrix to generate the background image; and displaying the background image and superposing and displaying the foreground image onto the background image.

2. The method of according to claim 1, wherein a focus of a virtual camera is located at a first position on the first plane, which is a position corresponding to a geometric center of the cover image on the first plane; and a focal length of the virtual camera is a distance from the first position to the virtual camera.

3. The method according to claim 1, wherein the method further comprises:

acquiring a depth value of each particle dot in the particle dot matrix, which is the distance from the particle dot to a virtual camera; and setting a size of each particle dot in accordance with the depth value of each particle dot;

wherein the size of the particle dot is negatively related to the depth value of the particle dot.

4. The method according to claim 1, wherein the first calculated value is a product of the amplitude corresponding to the last period and the attenuation coefficient;

the amplitude corresponding to the current period is a sum of the first calculated value and the attribute value of the sound attribute corresponding to the current period.

5. The method according to claim 1, wherein the movement distance of each particle dot in the particle dot matrix corresponding to the current period is a product of the first distance from each particle dot in the particle dot matrix corresponding to the current period to the first plane and the amplitude corresponding to the current period.

6. The method according to claim 1, wherein, from a center of the particle dot matrix along various directions to edges of the particle dot matrix, a color of particle dots in a particle matrix gradually changes from a first color to second color.

7. The method according to claim 6, wherein, before displaying the sound effect display interface corresponding to the audio file, the method further comprises:

acquiring an average color value of various pixels of the cover image;

converting the average color value into a color in an HSV color space to obtain a basic color; and determining the first color, the second color, and a background color of the sound effect display interface according to the basic color.

8. The method according to claim 7, wherein the determining the first color according to the basic color comprises:

determining that a hue of the first color is same as a hue of the basic color;

determining that a saturation of the first color is same as a saturation of the basic color if the saturation of the basic color is greater than or equal to a threshold saturation; and determining that the saturation of the first color is a sum of the saturation of the basic color and a first saturation if the saturation of the basic color is less than the threshold saturation; and determining a value of the first color as a maximum value.

9. The method according to claim 7, wherein the determining the second color according to the basic color comprises:

determining that a hue of the second color is a sum of a hue of the basic color and a first hue;

determining that a saturation of the second color is same as a saturation of the basic color if the saturation of the basic color is greater than or equal to a threshold saturation; and determining that the saturation of the second color is a sum of the saturation of the basic color and a first saturation if the saturation of the basic color is less than the threshold saturation; and determining a value of the second color as a maximum value.

10. The method according to claim 7, wherein the determining the background color according to the basic color comprises:

determining that a hue of the background color is same as a hue of the basic color;

determining that a saturation of the background color is same as a saturation of the basic color if the saturation of the basic color is greater than or equal to a threshold saturation; and determining that the saturation of the background color is a sum of the saturation of the basic color and a first saturation if the saturation of the basic color is less than the threshold saturation; and determining a value of the background color is a difference between a value of the basic color and a first value, wherein the first value is a value corresponding to a value range to which the value of the basic color belongs, and a value corresponding to the value range is positively correlated with a central value of the value range.

11. The method of according to claim 1, wherein the method further comprises:

acquiring a blur parameter of each particle dot in the particle dot matrix, wherein the blur parameter of the particle dot is an absolute difference between a distance from the particle dot to a virtual camera and a focal length of the virtual camera; and blurring each particle dot according to the blur parameter of each particle dot, wherein a blur degree of the particle dot is positively related to the blur parameter of the particle dot.

12. The method according to claim 11, wherein, from a center of the particle dot matrix along various directions to edges of the particle dot matrix, a color of particle dots in a particle matrix gradually changes from a first color to a second color.

13. The method according to claim 12, wherein, before displaying the sound effect display interface corresponding to the audio file, the method further comprises:

acquiring an average color value of various pixels of the cover image;

converting the average color value into a color in an HSV color space to obtain a basic color, and determining the first color, the second color, and a background color of the sound effect display interface according to the basic color.

14. An electronic device, comprising: a memory configured to store a computer program and a processor executing the computer program and configured to:

receive a first operation that is input to an audio file; and display a sound effect display interface corresponding to the audio file in response to the first operation, wherein the sound effect display interface comprises: a foreground image comprising a cover image corresponding to the audio file, and a background image which is an image obtained by shooting a particle dot matrix at a shooting angle, wherein the particle dot matrix comprises a plurality of dots with initial positions on a first plane, and each particle dot in the particle dot matrix moves in a direction perpendicular to the first plane according to a sound attribute of the audio file so that the particle dot matrix fluctuates according to the sound attribute of the audio file; and wherein displaying the sound effect display interface corresponding to the audio file comprises:

acquiring a first calculated value according to an amplitude corresponding to a last period and an attenuation coefficient;

acquiring an amplitude corresponding to a current period according to the first calculated value and an attribute value of a sound attribute corresponding to the current period;

determining a first distance from each particle dot in a particle dot matrix corresponding to the current period to a first plane according to an initial position of each particle dot in the particle dot matrix and a noise;

determining a movement distance of each particle dot in the particle dot matrix corresponding to the current period according to the amplitude corresponding to the current period and the first distance from each particle dot in the particle dot matrix corresponding to the current period to the first plane;

rendering the particle dot matrix according to the movement distance of each particle dot in the particle dot matrix to generate the background image; and displaying the background image and superposing and displaying the foreground image onto the background image.

15. The electronic device according to claim 14, wherein a focus of a virtual camera is located at a first position on the first plane, which is a position corresponding to a geometric center of the cover image on the first plane; and a focal length of the virtual camera is a distance from the first position to the virtual camera.

16. The electronic device according to claim 14, wherein the processor is further configured to:

acquire a depth value of each particle dot in the particle dot matrix, which is the distance from the particle dot to a virtual camera; and set a size of each particle dot in accordance with the depth value of each particle dot;

wherein the size of the particle dot is negatively related to the depth value of the particle dot.

17. The electronic device according to claim 14, wherein the first calculated value is a product of the amplitude corresponding to the last period and the attenuation coefficient;

the amplitude corresponding to the current period is a sum of the first calculated value and the attribute value of the sound attribute corresponding to the current period.

18. The electronic device according to claim 14, wherein the movement distance of each particle dot in the particle dot matrix corresponding to the current period is a product of the first distance from each particle dot in the particle dot matrix corresponding to the current period to the first plane and the amplitude corresponding to the current period.

19. The electronic device according to claim 14, wherein, from a center of the particle dot matrix along various directions to edges of the particle dot matrix, a color of particle dots in a particle matrix gradually changes from a first color to a second color.

20. A non-transitory computer-readable storage medium, wherein the computer-readable storage medium has a computer program stored thereon, and the computer program enables a computing device to:

receive a first operation that is input to an audio file; and display a sound effect display interface corresponding to the audio file in response to the first operation, wherein the sound effect display interface comprises: a foreground image comprising a cover image corresponding to the audio file, and a background image which is an image obtained by shooting a particle dot matrix at a shooting angle, wherein the particle dot matrix comprises a plurality of dots with initial positions on a first plane, and each particle dot in the particle dot matrix moves in a direction perpendicular to the first plane according to a sound attribute of the audio file so that the particle dot matrix fluctuates according to the sound attribute of the audio file; and wherein displaying the sound effect display interface corresponding to the audio file comprises:

acquiring a first calculated value according to an amplitude corresponding to a last period and an attenuation coefficient;

acquiring an amplitude corresponding to a current period according to the first calculated value and an attribute value of a sound attribute corresponding to the current period;

determining a first distance from each particle dot in a particle dot matrix corresponding to the current period to a first plane according to an initial position of each particle dot in the particle dot matrix and a noise;

determining a movement distance of each particle dot in the particle dot matrix corresponding to the current period according to the amplitude corresponding to the current period and the first distance from each particle dot in the particle dot matrix corresponding to the current period to the first plane;

rendering the particle dot matrix according to the movement distance of each particle dot in the particle dot matrix to generate the background image; and displaying the background image and superposing and displaying the foreground image onto the background image.

* * * * *